United States Patent
Zuo et al.

(10) Patent No.: US 11,284,410 B2
(45) Date of Patent: Mar. 22, 2022

(54) DATA TRANSMISSION METHOD, NETWORK DEVICE AND TERMINAL

(71) Applicants: China Mobile Communication Co., Ltd Research Institute, Beijing (CN); China Mobile Communications Group Co., Ltd., Beijing (CN)

(72) Inventors: Jun Zuo, Beijing (CN); Hui Tong, Beijing (CN); Shuangfeng Han, Beijing (CN); Sen Wang, Beijing (CN); Jiqing Ni, Beijing (CN)

(73) Assignees: China Mobile Communication Co., Ltd Research Institute, Beijing (CN); China Mobile Communications Group Co., Ltd., Beijing (CN)

(*) Notice: Subject to any disclaimer, the term of this patent is extended or adjusted under 35 U.S.C. 154(b) by 0 days.

(21) Appl. No.: 16/765,630

(22) PCT Filed: Sep. 19, 2018

(86) PCT No.: PCT/CN2018/106496
§ 371 (c)(1),
(2) Date: May 20, 2020

(87) PCT Pub. No.: WO2019/100830
PCT Pub. Date: May 31, 2019

(65) Prior Publication Data
US 2020/0281001 A1  Sep. 3, 2020

(30) Foreign Application Priority Data
Nov. 21, 2017  (CN) .......................... 201711168723.2

(51) Int. Cl.
*H04W 4/00* (2018.01)
*H04W 72/12* (2009.01)
(Continued)

(52) U.S. Cl.
CPC ........... *H04W 72/12* (2013.01); *H04W 4/029* (2018.02); *H04W 72/042* (2013.01)

(58) Field of Classification Search
CPC ....... H04Q 72/12; H04Q 72/042; H04Q 4/029
See application file for complete search history.

(56) References Cited

U.S. PATENT DOCUMENTS

| 2015/0256280 A1* | 9/2015 | Park ..................... | H04B 7/0456 |
| | | | 370/329 |
| 2017/0208568 A1* | 7/2017 | Nam ..................... | H04L 5/0094 |

(Continued)

FOREIGN PATENT DOCUMENTS

| CN | 102932111 A | 2/2013 |
| CN | 103687029 A | 3/2014 |
| WO | 2018232090 A1 | 12/2018 |

OTHER PUBLICATIONS

"On Beam Indication", 3GPP TSG RAN WG1 Meeting #90bis, Oct. 9-13, 2017; R1-1717627; Prague, Czech, Revision of R1-1715964.

(Continued)

*Primary Examiner* — Erika A Washington
(74) *Attorney, Agent, or Firm* — Price Heneveld LLP

(57) ABSTRACT

The present disclosure provides a data transmission method, a network device and a terminal. In embodiments of the present disclosure, the network device determines a processing interval of the terminal according to parameter(s) reported by the terminal, and then compares a scheduling interval for resource allocation for the terminal with the determined processing interval of the terminal. When the scheduling interval is less than the processing interval, the network device transmits data through a physical downlink shared channel after the scheduling interval by using preconfigured quasi-co-location information corresponding to the terminal.

17 Claims, 10 Drawing Sheets

(51) Int. Cl.
    *H04W 4/029*     (2018.01)
    *H04W 72/04*     (2009.01)

(56) References Cited

U.S. PATENT DOCUMENTS

| | | | |
|---|---|---|---|
| 2018/0049047 A1* | 2/2018 | Lin | H04W 24/02 |
| 2019/0229874 A1* | 7/2019 | Lee | H04L 5/005 |

OTHER PUBLICATIONS

"On Beam Indication", 3GPP TSG RAN WG1 Meeting #90bis, Oct. 9-13, 2017, R1-1717612, Prague, Czech.

NTT Docomo: "Views on NR Beam Management", 3GPP Draft; R1-1720803 Beam Management, 3rd Generation Partnership Project (3GPP), Mobile Competence Centre; 650, Route Des Lucioles; F-06921 Sophia-Antipolis Cedex; France; vol. RAN WG1, No. Reno, USA; Nov. 27, 2017-Dec. 1, 2017 Nov. 18, 2017 (Nov. 18, 2017), XP051370232, Retrieved from the Internet: URL:http://www.3gpp.org/ftp/tsg%5Fran/WG1%5FRL17TSGR1%5F91/Docs/ [retrieved on Nov. 18, 2017].

Samsung CATT Huawei HiSilicon NTT Docomo MediaTek Intel OPPO Spreadtrum AT&T InterDigital CHTTL KDDI LG Electronics Sony China Uni: "WF on Beam Management", 3GPP Draft; R1-1719059, 3rd Generation Partnership Project (3GPP), Mobile CompetenceCentre ; 650, Route Des Lucioles,; F-06921 Sophia-Antipolis Cedex; France, vol. RAN WG1, No. Prague, Czech; Oct. 9, 2017-Oct. 13, 2017 Oct. 13, 2017 (Oct. 13, 2017), XP051353538, Retrieved from the Internet: URL:http://www.3gpp.org/ftp/tsg_ran/WG1_RL1TSGR1_90b/Docs/ [retrieved on Oct. 13, 2017].

ZTE SANECHIPS Intel ASTRI LGE Vivo [HuaweiHiSilicon CATT Qualcomm Nokie: "WF on beam management", 3GPP Draft; R1-1721493 Joint WF on Beam Management, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 27, 2017 Dec. 1, 2017 Nov. 29, 2017 (Nov. 29, 2017), XP051364012, Retrieved from the Internet: URL:http//www.3gpp.org/ftp/Meetings%5F3GPP%5FSYNC/RAN1/Docs/ [retrieved on Nov. 29, 2017].

"3rd Generation Partnership Project; Technical Specification Group Radio Access Network; NR; Physical layer procedures for data (Release 15)", 3GPP TS 38.214 V1.2.0 (Nov. 2017), Valbonne, France.

* cited by examiner

DATA TRANSMISSION METHOD, NETWORK DEVICE AND TERMINAL

CROSS-REFERENCE TO RELATED APPLICATION

The present disclosure is the U.S. national phase of PCT Application PCT/CN2018/106496 filed on Sep. 19, 2018, which claims the benefit and priority of Chinese Application No. 201711168723.2, filed on Nov. 21, 2017, the disclosures of which are incorporated in their entirety by reference herein.

TECHNICAL FIELD

The present disclosure relates to the field of communication technologies, and in particular to a data transmission method, a network device and a terminal.

BACKGROUND

In the 5th-Generation (5G) mobile communication technology, a multi-antenna system adopts a hybrid architecture of digital and analog domains to balance coverage and complexity. A plurality of analog beams are configured between a base station and a user equipment, then beam management is required to enable beams with better channel quality to be used between the user equipment and the base station to ensure transmission rate of communication. The downlink beam management mainly includes that a base station transmits a beam management reference signal; a user equipment measures and reports a beam measurement result; and the base station selects a downlink transmission beam and indicates relevant beam information to the user equipment, so that the user equipment receives downlink data through a beam matched with the transmission beam from the base station. The beam indication information of downlink control channel may be transmitted to the user equipment through high-level signaling, and the beam indication information of the downlink data channel may be dynamically indicated through downlink control information (DCI). The DCI includes a 3-bit Transmission Configuration Indication (TCI) field. The TCI indicates Quasi-Co-Location (QCL) information of a Demodulation Reference Signal (DMRS) of the downlink data channel, and the beam indication information is obtained through a QCL-TypeD, so that the user equipment can obtain the beam indication information from the DCI. Considering that the user equipment needs a certain time from receiving the beam indication information to completing beam switching, thus, a certain time interval, referred to as a processing interval, is needed in the time domain from receiving the downlink control channel information to receiving the downlink data information.

The 3rd Generation Partnership (3GPP) in the related art supports flexible scheduling, that is, a starting position of a physical downlink shared channel (PDSCH) scheduled by DCI in timeslot is not fixed, and there is a certain scheduling interval between the two. The scheduling interval information (i.e., starting time information of PDSCH) is contained in DCI.

According to size relationship between the scheduling interval and the processing interval, there is no relevant scheme about how to transmit data on PDSCH.

In summary, there is no scheme for data transmission on the PDSCH according to the size relationship between the scheduling interval and the processing interval.

SUMMARY

The present disclosure provides a data transmission method, a network device and a terminal, which can solve the problem in the related art that there is no scheme about how to process data when a scheduling interval is less than a processing interval in a process of data transmission. One embodiment of the present disclosure provides a method for performing data transmission, which includes the following steps:

determining, by a network device, a processing interval of a terminal according to parameter(s) reported by the terminal;

comparing, by the network device, a scheduling interval for resource allocation for the terminal with the determined processing interval of the terminal;

when the scheduling interval is less than the processing interval, transmitting, by the network device, data through PDSCH after the scheduling interval by using pre-configured quasi co-location information corresponding to the terminal.

One embodiment of the present disclosure further provides a method for performing data transmission, which includes the following steps: reporting, by a terminal, parameter(s) to a network device; wherein the parameter(s) is used to determine a processing interval of the terminal.

One embodiment of the present disclosure further provides a network device for performing data transmission, including: a processor and a transceiver;

wherein the processor is used to determine a processing interval of a terminal according to parameter(s) reported by the terminal; compare a scheduling interval for resource allocation for the terminal with the determined processing interval of the terminal; when the scheduling interval is less than the processing interval, use the transceiver to transmit data through PDSCH after the scheduling interval by using pre-configured quasi co-location information corresponding to the terminal.

One embodiment of the present disclosure further provides a terminal for performing data transmission, including: a transceiver; wherein the transceiver is used to report parameter(s) to a network device, and receive data through PDSCH during a processing interval by using pre-configured quasi co-location information corresponding to the terminal.

One embodiment of the present disclosure further provides a network device for performing data transmission, including: at least one processing unit and at least one storage unit; wherein the storage unit stores program codes, and the program codes are executed by the processing unit to cause the processing unit to perform steps of any method for performing data transmission performed by the network device.

One embodiment of the present disclosure further provides a terminal for performing data transmission, including: at least one processing unit and at least one storage unit; wherein the storage unit stores program codes, and the program codes are executed by the processing unit to cause the processing unit to perform steps of the method for assisting a network device to transmit data by the terminal.

One embodiment of the present disclosure further provides a computing device readable storage medium including program codes. When the program codes are run on a computing device, the program codes causes the computing device to perform steps of any method for performing data transmission performed by the network device, or to perform steps of the method for assisting a network device to transmit data by the terminal.

In the embodiment of the present disclosure, the network device determines the processing interval of the terminal according to parameter(s) reported by the terminal, then compares the scheduling interval for resource allocation for the terminal with the determined processing interval of the terminal. When the scheduling interval is less than the processing interval, the network device transmits data through PDSCH after the scheduling interval by using pre-configured quasi co-location information corresponding to the terminal. In the present disclosure, when the scheduling interval is determined to be less than the processing interval according to the size relationship between the processing interval and the scheduling interval, the pre-configured quasi-co-location information is used for data transmission. Therefore, when the scheduling interval is less than the processing interval, data transmission can be performed between the network device and the terminal through the PDSCH. Further, data transmission can also be performed through the PDSCH after the scheduling interval ends but before the processing interval ends, thereby improving resource utilization.

BRIEF DESCRIPTION OF THE DRAWINGS

In order to illustrate technical solutions according to embodiments of the present disclosure more clearly, drawings to be used in the description of the embodiments will be described briefly hereinafter. Apparently, the drawings described hereinafter are only some embodiments of the present disclosure, and other drawings may be obtained by those skilled in the art according to those drawings without creative work.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments are merely a part of, rather than all of, the embodiments of the present disclosure, and based on these embodiments, a person skilled in the art may obtain the other embodiments, which also fall within the scope of the present disclosure.

Figure 1:
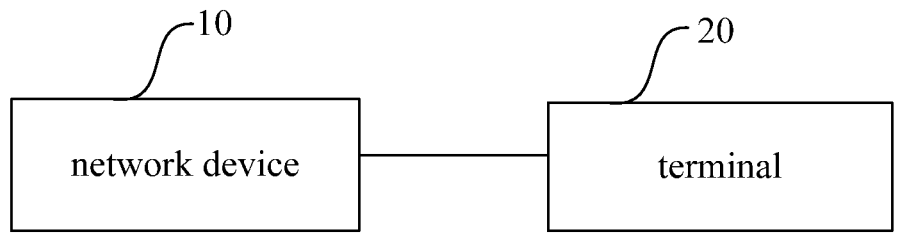
FIG. 1 is a schematic diagram of a data transmission system according to an embodiment of the present disclosure.

As shown in FIG. 1, a data transmission system according to an embodiment of the present disclosure includes: a network device 10 and a terminal 20.

The network device 10 is used to determine a processing interval of a terminal according to parameter(s) reported by the terminal; compare a scheduling interval for resource allocation for the terminal with the determined processing interval of the terminal; when the scheduling interval is less than the processing interval, transmit data through PDSCH after the scheduling interval by using pre-configured quasi co-location information corresponding to the terminal.

The scheduling interval and the processing interval respectively have attributes of interval length. For example, if the scheduling interval is less than the processing interval, it means that the length of the scheduling interval is less than the length of the processing interval.

Since the beam indication information is obtained through the QCL-TypeD, the QCL may be referred to as beam information.

The terminal 20 is used to report the parameter(s) to the network device, where the parameter(s) is used to determine the processing interval of the terminal, so that when the scheduling interval for resource allocation for the terminal is less than the processing interval determined according to the parameter(s), the network device transmits data through PDSCH after the scheduling interval by using pre-configured quasi co-location information corresponding to the terminal, and receives data through PDSCH during the processing interval by using pre-configured quasi co-location information corresponding to the terminal.

In one embodiment of the present disclosure, the network device determines the processing interval of the terminal according to the parameter(s) reported by the terminal, and then compares the scheduling interval for resource allocation for the terminal with the determined processing interval of the terminal. When the scheduling interval is less than the processing interval, the network device transmits data through PDSCH after the scheduling interval by using pre-configured quasi co-location information corresponding to the terminal. In the present disclosure, when the scheduling interval is determined to be less than the processing interval according to the size relationship between the processing interval and the scheduling interval, the pre-configured quasi-co-location information is used for data transmission. Therefore, when the scheduling interval is less than the processing interval, data transmission can be performed between the network device and the terminal through the PDSCH. Further, data transmission can also be performed through the PDSCH after the scheduling interval ends but before the processing interval ends, thereby improving resource utilization.

The parameters used by the network device to determine the processing interval include, but are not limited to, part or all of the following: service type, packet size, etc.

It should be noted that different manufacturers of network devices may use different algorithms to determine the length of the processing interval according to the above parameters. For example, the algorithms for determining the length of the processing interval include: the processing interval is equal to processing time reported by user equipment, or, the processing interval is equal to a sum of the processing time reported by the user equipment and a terminal switching beam time. The terminal switching beam time may be a predefined typical value.

In implementation, the parameter(s) reported by the terminal is any information that enables the network device to determine the processing interval of the terminal. For example, the parameter(s) reported by the terminal includes processing capability of the terminal and/or the processing interval.

The processing capability of the terminal includes its hardware capability, antenna configuration, and the like.

In implementation, the terminal reports each parameter in the processing capability of the terminal or the processing interval, to the network device. Then, the network device can determine the processing interval, and then compare the processing interval with the scheduling interval to determine the relationship between the scheduling interval and the processing interval, thereby accurately configuring a beam for transmitting data and improving the flexibility of system scheduling.

In implementation process, which quasi co-location information is specifically adopted by the network device to transmit data is mainly determined by the relationship between the scheduling interval and the processing interval, which is described below.

Network-side mode one: when the scheduling interval is less than the processing interval, the network device transmits data through the PDSCH after the scheduling interval by using the pre-configured quasi-co-location information.

Specifically, the network device determines the processing interval of the terminal according to the parameter(s) reported by the terminal; then, the network device compares the scheduling interval for resource allocation for the terminal with the determined processing interval of the terminal.

When the scheduling interval is less than the processing interval, the network device transmits data through PDSCH after the scheduling interval by using pre-configured quasi co-location information corresponding to the terminal.

The pre-configured quasi co-location information corresponding to the terminal may include:

quasi co-location information 1 which is configured by the network device through radio resource control (RRC) signaling or media access control-control element (MAC-CE) signaling; and quasi co-location information 2 which is the same as quasi co-location information used for receiving DCI.

The quasi-co-location information 1 and the quasi-co-location information 2 may be configured in only one way, that is, they are all configured by the network device through RRC signaling or MAC-CE signaling, or they are the same as the quasi co-location information used for receiving DCI.

There is another way that if the network device configures the quasi co-location information through the RRC signaling or the MAC-CE signaling, the corresponding pre-configuration of the terminal is configured by the network device through the RRC signaling or the MAC-CE signaling;

if the network device does not configure the quasi co-location information through the RRC signaling or the MAC-CE signaling, the corresponding pre-configuration of the terminal is the same as the quasi co-location information used for receiving DCI.

Figure 2:
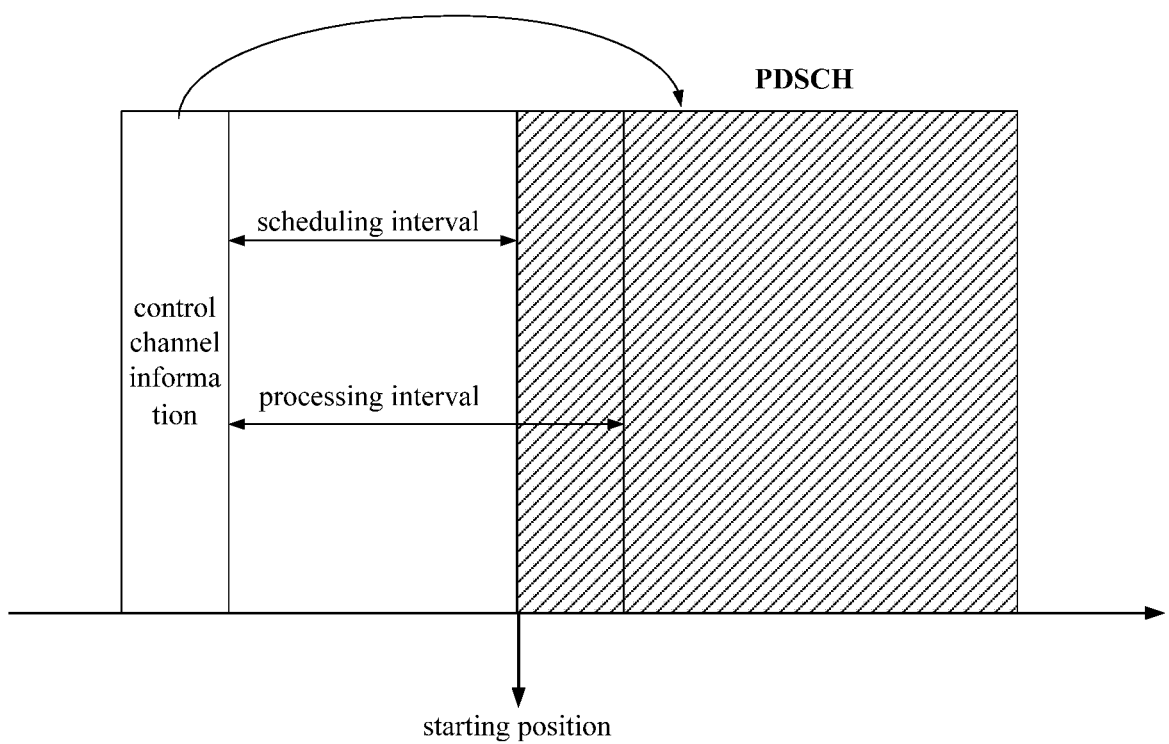
FIG. 2 is a schematic diagram showing a downlink beam indication when a scheduling interval is less than a processing interval, or showing a starting position of PDSCH in the processing interval according to an embodiment of the present disclosure.

As shown in FIG. 2, in this case, the scheduling interval is less than the processing interval, and the pre-configured quasi co-location information corresponding to the terminal is used for data transmission.

Network-side mode two: when the scheduling interval is not less than the processing interval, the network device transmits data through PDSCH after the scheduling interval by using corresponding quasi-co-location in DCI of the terminal.

Specifically, the network device determines the processing interval of the terminal according to the parameter(s) reported by the terminal; then, the network device compares the scheduling interval for resource allocation for the terminal with the determined processing interval of the terminal. When the scheduling interval is not less than the processing interval, the network device transmits data through PDSCH after the scheduling interval by using corresponding quasi-co-location information in DCI of the terminal.

Figure 3:
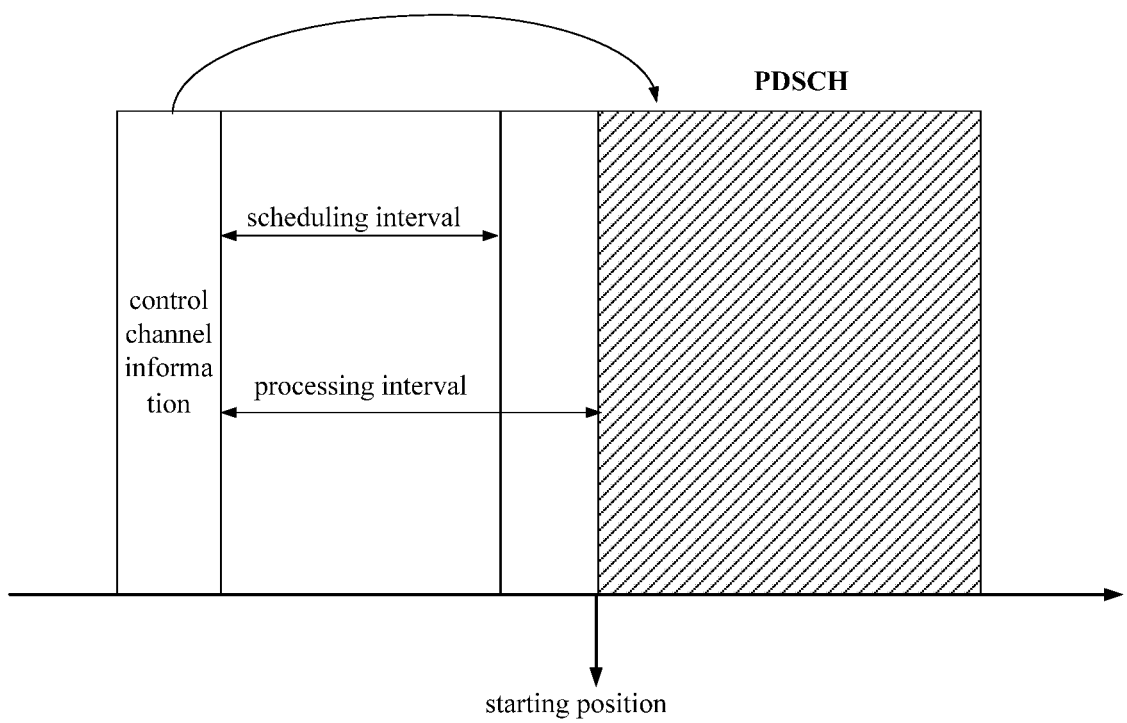
FIG. 3 is a schematic diagram showing a downlink beam indication when a scheduling interval is not less than a processing interval, or showing a starting position of PDSCH after the processing interval according to an embodiment of the present disclosure.

As shown in FIG. 3, in this case, the scheduling interval is not less than the processing interval, and the network device transmits data through PDSCH after the scheduling interval by using corresponding quasi-co-location information in DCI of the terminal.

The corresponding quasi co-location information in DCI of the terminal refers to quasi co-location information indicated by DCI received by the terminal.

In implementation, according to the relationship between the scheduling interval and the processing interval, the network device determines which quasi co-location information is specifically adopted to transmit data, thereby improving flexibility of system scheduling.

As to which quasi-co-location information is specifically adopted by the terminal to receive data through PDSCH, it is mainly determined according to relationship between the processing interval and a starting position of PDSCH determined by the terminal via identifying identifies DCI information, which will be introduced hereinafter with the following modes.

Terminal mode one: according to relationship between a starting position of PDSCH and the processing interval, when the starting position of PDSCH is in the processing interval, the terminal adopts pre-configured quasi co-location information corresponding to the terminal.

Specifically, the terminal reports the parameter(s) to the network device and receives DCI.

Correspondingly, the network device determines the processing interval of the terminal according to the parameter(s) reported by the terminal. Then, the network device compares the scheduling interval for resource allocation for the terminal with the determined processing interval of the terminal. When the scheduling interval is less than the processing interval, the network device transmits data through PDSCH after the scheduling interval by using pre-configured quasi-co-location information corresponding to the terminal.

The terminal identifies the DCI received before the processing interval and determines the starting position of the PDSCH.

When the determined starting position of the PDSCH is in the processing interval, the terminal receives data through the PDSCH in the processing interval by using the pre-configured quasi co-location information corresponding to the terminal.

As shown in FIG. 2, the starting position of the PDSCH is adjacent to the scheduling interval and the scheduling interval is less than the processing interval; in this case, the starting position of the PDSCH is in the processing interval, and the pre-configured quasi co-location information corresponding to the terminal is used for data transmission.

Since the network device transmits data through the PDSCH after the scheduling interval by using the pre-configured quasi co-location information corresponding to the terminal, and the terminal receives data through the PDSCH in the processing interval by using the pre-configured quasi co-location information corresponding to the terminal. Thus, the terminal can receive all data transmitted through the PDSCH by the network device after the scheduling interval.

The pre-configured quasi co-location information corresponding to the terminal may include:

quasi co-location information 1 which is configured by the network device through RRC signaling or MAC-CE signaling; and quasi co-location information 2 which is the same as quasi co-location information used for receiving DCI.

The quasi-co-location information 1 and the quasi-co-location information 2 may be configured in only one way, that is, they are configured by the network device through the RRC signaling or the MAC-CE signaling, or, they are the same as quasi co-location information used for receiving DCI.

There is another way that if the network device configures the quasi co-location information through the RRC signaling or the MAC-CE signaling, the corresponding pre-configuration of the terminal is configured by the network device through the RRC signaling or the MAC-CE signaling;

if the network device does not configure the quasi co-location information through the RRC signaling or the MAC-CE signaling, the corresponding pre-configuration of the terminal is the same as the quasi co-location information used for receiving DCI.

Based on this, after the terminal determines the starting position of the PDSCH through the received DCI, when the starting position of the PDSCH is in the processing interval, the terminal receives data through the PDSCH after the processing interval by using the pre-configured quasi-co-location information corresponding to the terminal.

As shown in FIG. 2, in this case, the starting position of the PDSCH determined according to the DCI is in the processing interval, and data is received through the PDSCH by using the pre-configured quasi-co-location information corresponding to the terminal.

Specifically, in an implementation process, the terminal reports the parameter(s) such as the processing capacity or the length of the processing time to the network device. The network device can calculate the processing time according to parameters reported by the terminal, and then compares the processing time with the scheduling interval determined by the network device according to the service type and the data packet size of each terminal. When the scheduling interval is determined to be less than the processing interval, data is transmitted through PDSCH after the scheduling interval by using the configured quasi-co-location information corresponding to the terminal. After the terminal receives DCI, the terminal decodes the received signaling, determines a starting position of PDSCH, and determines that the starting position of the PDSCH is in the processing interval according to the starting position information of the PDSCH. At this point, the terminal receives data through the PDSCH by pre-configured quasi co-location information of the terminal. However, after the terminal completes the decoding of the DCI, PDSCH has been used for data transmission and reception from the starting position, thus, first few symbols at the starting position of the PDSCH may contain demodulation reference signal (DMRS) required for decoding the PDSCH for the related demodulation of the PDSCH channel. In order to ensure correct decoding, the DMRS needs to use the same quasi-co-location information as the PDSCH for receiving data, thus, at this point, all PDSCH symbols of the user equipment in the slot should be received by using the pre-configured quasi-co-location information, and the corresponding PDSCH is decoded according to the starting position information of the PDSCH in the DCI.

Based on this, after the terminal determines the starting position of the PDSCH through the received DCI, when the starting position of the PDSCH is in the processing interval, the terminal receives data through the PDSCH after the processing interval by using the pre-configured quasi-co-location information corresponding to the terminal.

Terminal mode two: according to relationship between the starting position of the PDSCH and the processing interval, when the starting position of the PDSCH is after the processing interval, the terminal uses quasi-co-location information in DCI.

Specifically, the terminal reports the parameter(s) to the network device and receives DCI.

Correspondingly, the network device determines the processing interval of the terminal according to the parameter(s) reported by the terminal. Then, the network device compares the scheduling interval for resource allocation for the terminal with the determined processing interval of the terminal. When the scheduling interval is not less than the processing interval, the network device transmits data through PDSCH after the scheduling interval by using the corresponding quasi-co-location information in the DCI of the terminal.

The terminal identifies the DCI received before the processing interval and determines the starting position of the PDSCH.

When the determined starting position of the PDSCH is after the processing interval, the terminal receives data through the PDSCH after the processing interval by using the quasi-co-location information in the DCI.

As shown in FIG. 3, the starting position of the PDSCH is adjacent to the scheduling interval and the scheduling interval is not less than the processing interval; in this case, the starting position of the PDSCH is after the processing interval, the quasi-co-location information in the DCI is used for data transmission.

Since the network device transmits data through the PDSCH after the scheduling interval by using the quasi-co-location information in the DCI corresponding to the terminal, and the terminal receives data through the PDSCH after the processing interval by using the quasi-co-location information in the DCI. Thus, the terminal can receive all data transmitted through the PDSCH by the network device after the scheduling interval.

Based on this, after the terminal determines the starting position of the PDSCH through the received DCI, when the starting position of the PDSCH is after the processing interval, the terminal receives data through the PDSCH after the processing interval by using the quasi-co-location information in the DCI.

As shown in FIG. 3, in this case, the starting position of the PDSCH determined according to the DCI is after the processing interval, and data is received through the PDSCH by using the quasi-co-location information in the DCI.

In implementation, the terminal identifies the received DCI to determine the starting position of the PDSCH, and determines which quasi co-location information is specifically adopted to receive data through the PDSCH according to the relationship between the starting position information of the PDSCH and the processing interval, and determines data that the terminal should receive through the PDSCH, thereby improving the resource utilization rate and further enhancing the flexibility of system scheduling.

Optionally, after the terminal determines the starting position of the PDSCH through DCI, the method further includes:

when the starting position of the PDSCH is after the processing interval and the quasi co-location information in the DCI is different from the pre-configured quasi co-location information corresponding to the terminal, performing, by the terminal, beam switching according to the quasi co-location information in the DCI.

Specifically, the DCI includes the starting position information of the PDSCH; after the terminal decodes the DCI information, the terminal determines the position of the PDSCH in the DCI and corresponding quasi co-location information in the DCI. When the determined starting position information of the PDSCH is after the processing interval and the quasi co-location information in the DCI is different from the pre-configured quasi co-location information corresponding to the terminal, the terminal performs beam switching according to the quasi co-location information in the DCI.

In implementation, the terminal determines the quasi-co-location information for performing beam switching, according to the starting position information of the PDSCH and the quasi-co-location information in the DCI obtained by decoding the DCI, thereby improving the flexibility of system scheduling.

Based on the above, another way of performing data transmission is provided in the embodiments of the present disclosure, which is described in detail below.

The network device determines time domain position of UE-specific control information according to a mapping position of control resource set corresponding to the terminal in a slot and a position of DCI corresponding to the terminal in the control resource set.

The network device judges whether a time interval is set between the control resource set and PDSCH according to the determined time domain position.

The network device configures the terminal according to the judgment result.

Specifically, the control resource set may be mapped to a foremost position of a slot, and the UE-specific control channel information occupies part or all of symbols of the control resource set.

For example, as shown in FIG. 4 to FIG. 6F, a control resource set may be mapped to first N symbols in a slot, where the control resource set is represented by a filled pattern in the slot and N may be 1, 2, or 3. When N=1, it means that the control resource set is mapped to the foremost first symbol in the slot, and the first symbol is represented by #0. At this point, DCI occupies all symbols of the control resource set, that is, DCI occupies #0. When N=2, it means that the control resource set is mapped to the first two symbols including #0 and #1 in the slot. At this point, DCI may occupy part or all of symbols of the control resource set, that is, the DCI may occupy #0 or/and #1. When N=3, it means that the control resource set occupies the first three symbols including #0, #1, #2 in the slot. At this point, DCI may occupy part or all of symbols of the control resource set, that is, DCI may occupy #0 or #1 or #2, DCI may occupy #0 and #1, DCI may occupy #1 and #2, DCI may occupy #0 and #2, and DCI may occupy #0 and #1 and #2.

The DCI includes quasi-co-location indication information, where the quasi-co-location indication information may be located in symbol #0, #1, or #2 of the slot, which is consistent with the position of DCI in the time domain.

The time interval is a time required for converting the quasi co-location indication information included in the DCI into data information that can be received by the PDSCH.

Optionally, when the network device judges whether a time interval is set between the control resource set and the PDSCH according to the determined time domain position, if the UE-specific control channel information occupies part or all of non-last symbols in the control resource set, the network device determines that no time interval is set between the control resource set and the PDSCH; or, if the UE-specific control channel information occupies the last symbol in the control resource set, the network device determines that a time interval is set between the control resource set and the physical downlink shared channel (PDSCH).

Specifically, whether a time interval needs to be set between the control resource set and the PDSCH is determined mainly according to the time domain position occupied by the DCI in the control resource set. When the DCI only occupies part of the symbols of the control resource set and does not occupy the last symbol of the N symbols of the control resource set, no time interval is needed to be set between the control resource set and the PDSCH; and the time interval needs to be set under other conditions. This is because the symbols occupied by the control resource set, which are before the PDSCH and after the control channel information, can be used for the beam switching.

Figure 4:
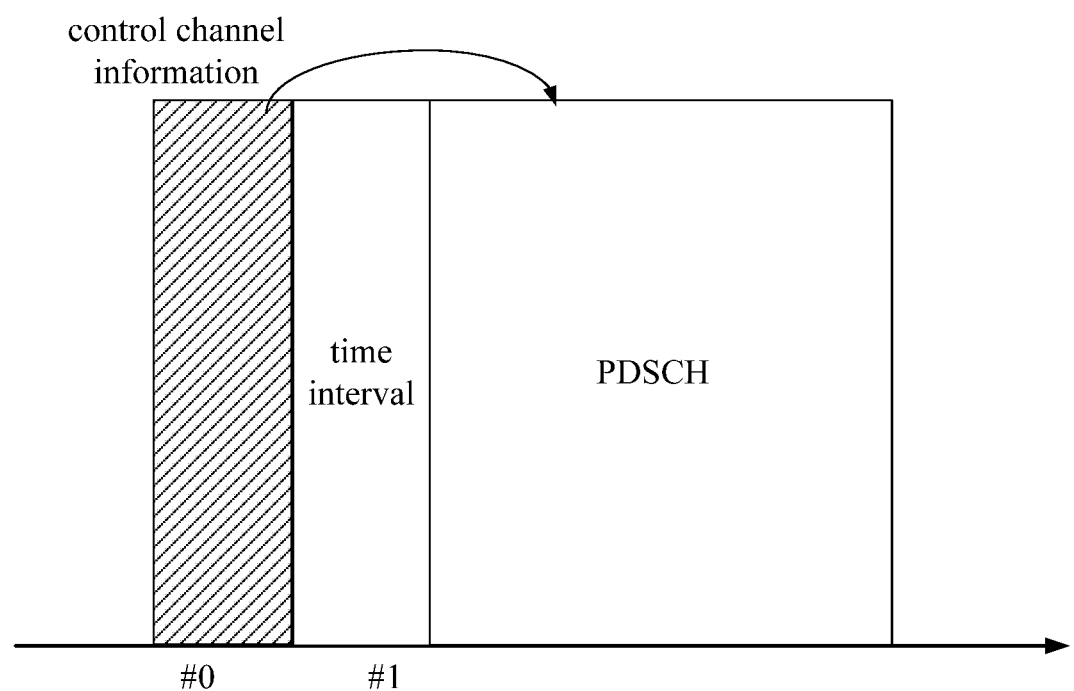
FIG. 4 is a schematic diagram showing mapping of a control resource to a foremost first symbol in a slot according to an embodiment of the present disclosure.

As shown in FIG. 4, the position of the control resource set mapped to the slot in the time domain is indicated by a filled pattern. As can be seen from FIG. 4, when the control resource set is mapped to the #0 symbol of the slot in the time domain, then DCI including quasi-co-location information is located in the #0 symbol. At this point, the UE-specific DCI occupies all symbols of the control resource set. Assuming that the time interval is 1 symbol and the time interval occupies the #1 symbol in the time domain, then, the terminal determines that PDSCH follows the #1 symbol.

Figure 5A:
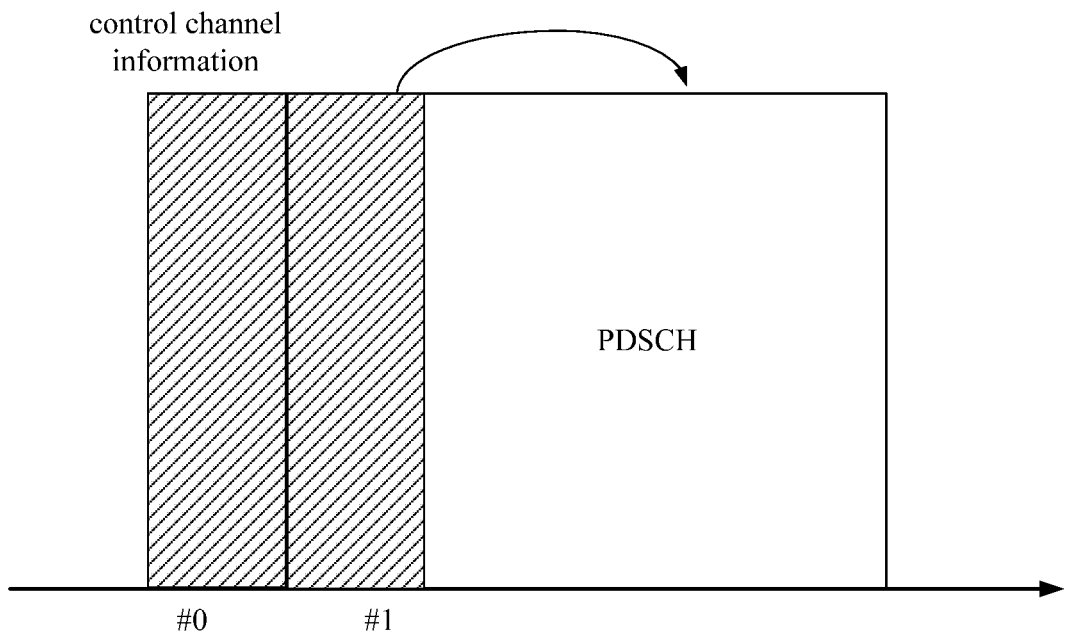
FIG. 5A is a schematic diagram showing mapping of a control resource set to first two symbols of a slot with control channel information occupying a first symbol of the control resource set according to an embodiment of the present disclosure.

As shown in FIG. 5A, the control resource set is mapped to the first two symbols of the slot in the time domain, that is, symbols #0 and #1. At this point, DCI containing quasi-co-location information occupies all symbols except for the last symbol in the control resource set, that is, the DCI occupies the first symbol in the control resource set and is located at the #0 symbol. At this point, the network device determines that no time interval is set between the control resource set and the PDSCH, and then the terminal determines that PDSCH follows the #1 symbol.

Figure 5B:
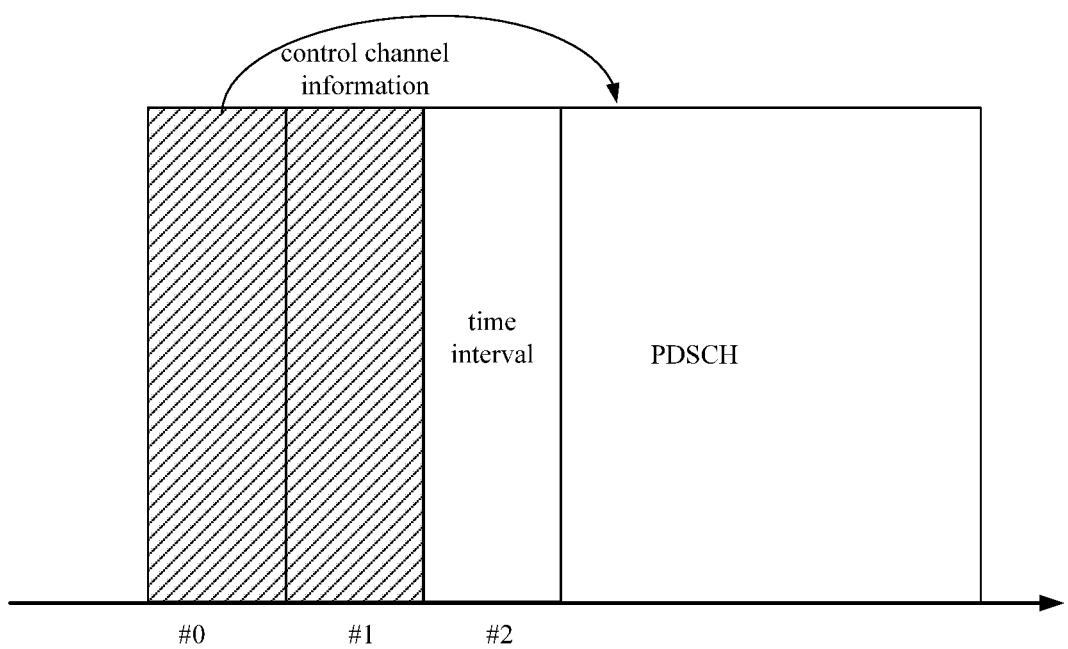
FIG. 5B is a schematic diagram showing mapping of a control resource set to first two symbols of a slot with control channel information occupying a second symbol of the control resource set according to an embodiment of the present disclosure.
Figure 5C:
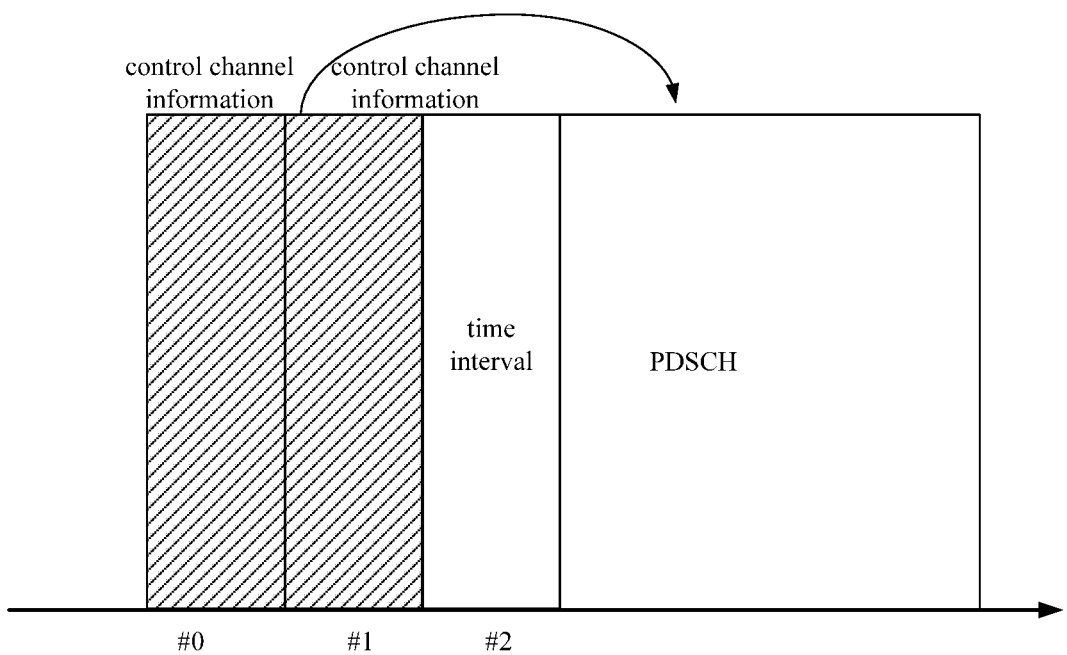
FIG. 5C is a schematic diagram showing mapping of a control resource set to first two symbols of a slot with control channel information occupying all symbols of the control resource set according to an embodiment of the present disclosure.

As shown in FIG. 5B and FIG. 5C, the control resource set is mapped to the first two symbols of the slot in the time domain, that is, symbols #0 and #1. At this point, DCI including quasi co-location information in FIG. 5B occupies the last symbol in the control resource set, that is, the #1 symbol, and then the network device determines that a time interval is set between the control resource set and the PDSCH. DCI including quasi co-location information in FIG. 5C occupies all symbols in the control resource set, including the last symbol, that is, the symbols #0 and #1, then the network device determines that a time interval is set between the control resource set and the PDSCH, and then the terminal determines that PDSCH follows the symbol #2.

Figure 6A:
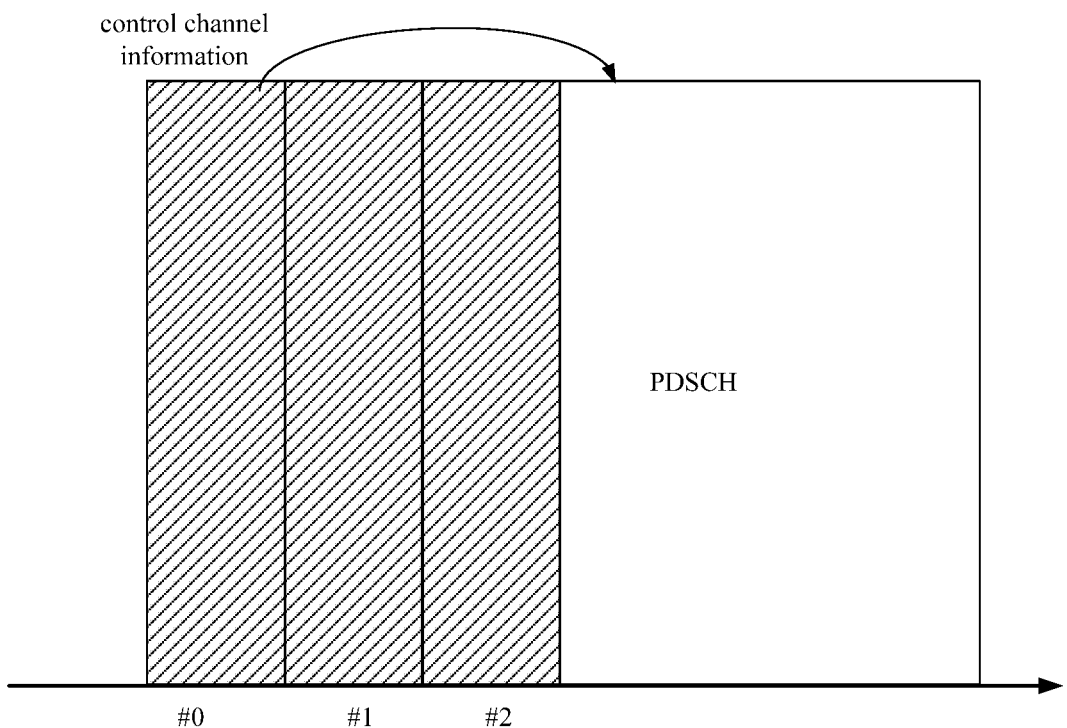
FIG. 6A is a schematic diagram showing mapping of a control resource set to first three symbols of a slot with control channel information occupying a first symbol of the control resource set according to an embodiment of the present disclosure.
Figure 6B:
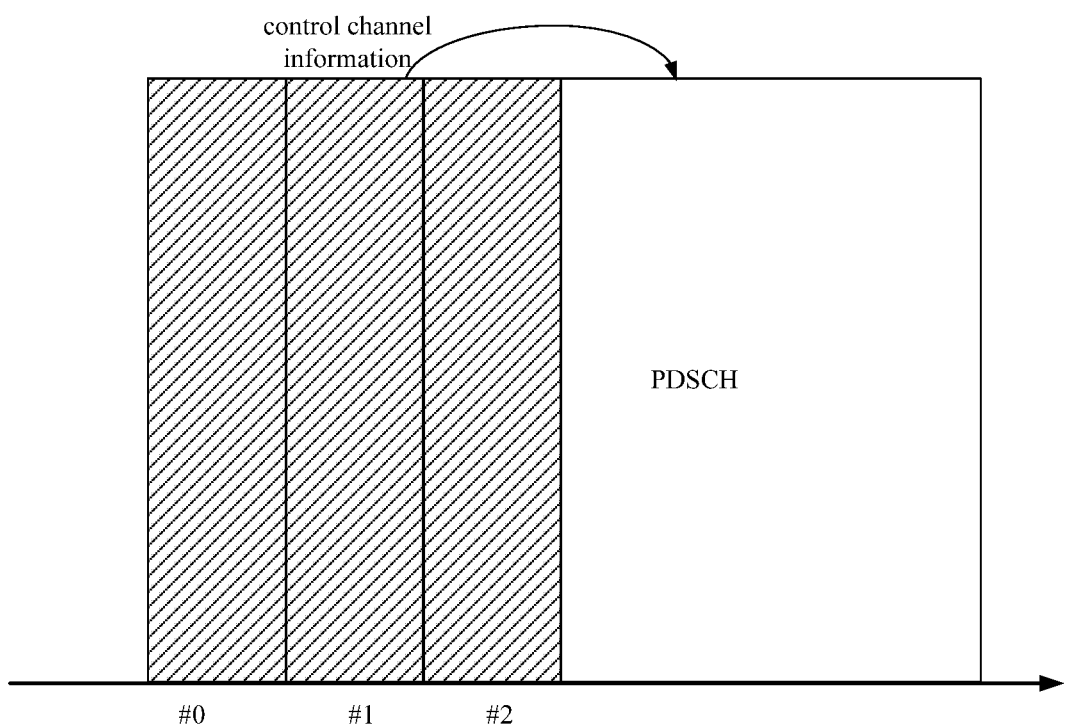
FIG. 6B is a schematic diagram showing mapping of a control resource set to first three symbols of a slot with control channel information occupying a second symbol of the control resource set according to an embodiment of the present disclosure.
Figure 6C:
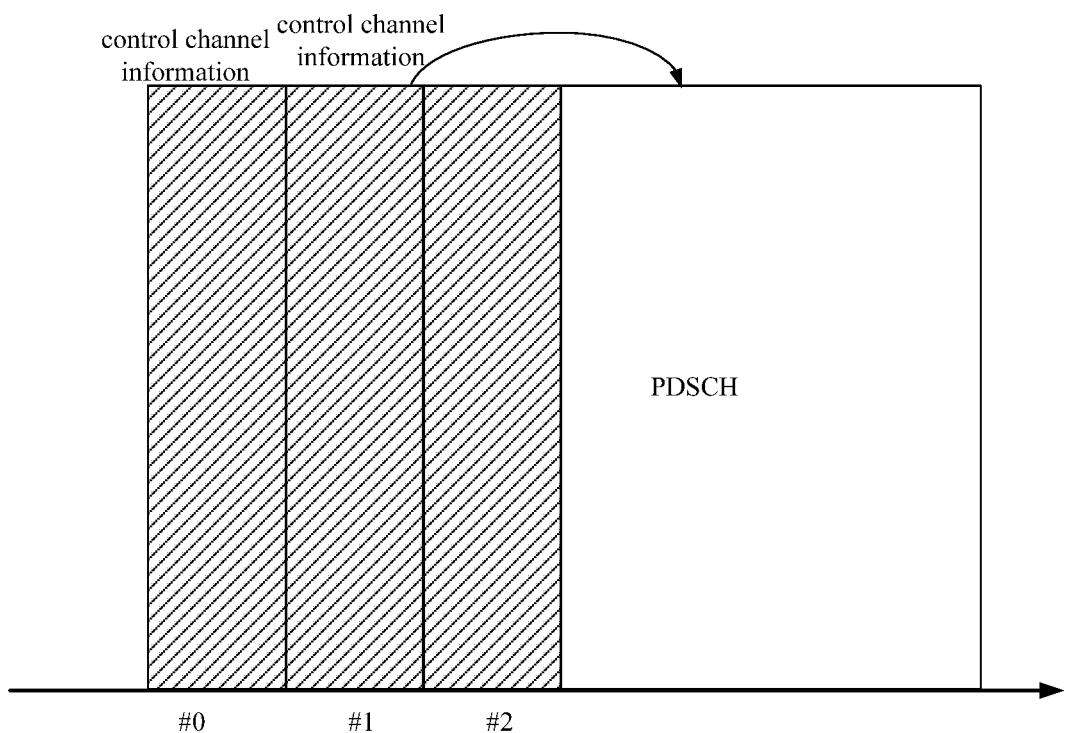
FIG. 6C is a schematic diagram showing mapping of a control resource set to first three symbols of a slot with control channel information occupying a first two symbols of the control resource set according to an embodiment of the present disclosure.
Figure 6D:
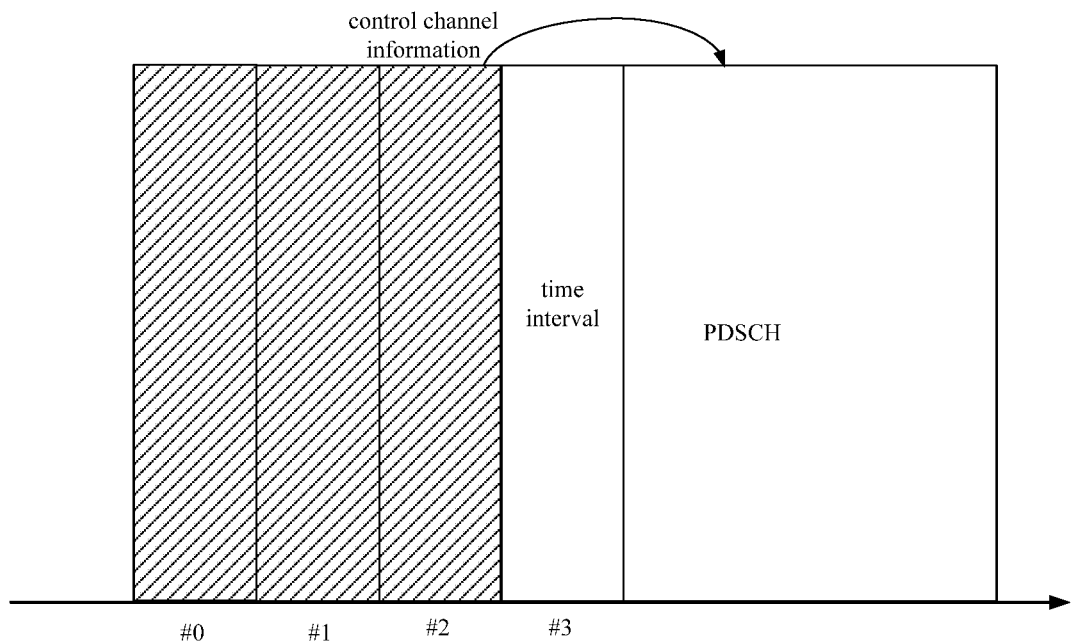
FIG. 6D is a schematic diagram showing mapping of a control resource set to first three symbols of a slot with control channel information occupying a last symbol of the control resource set according to an embodiment of the present disclosure.
Figure 6E:
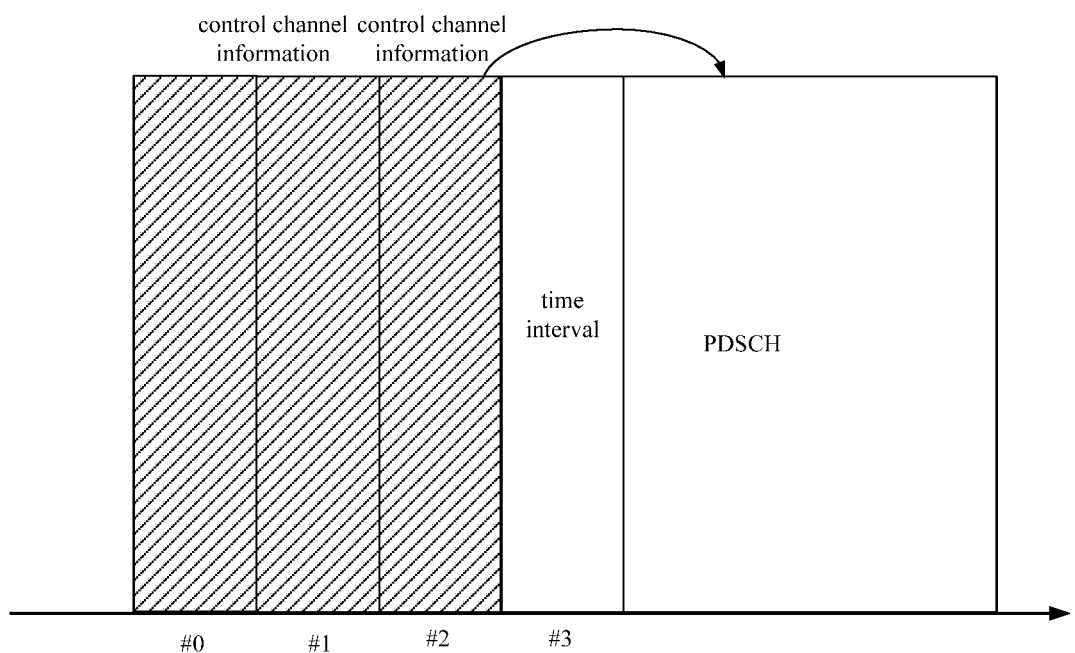
FIG. 6E is a schematic diagram showing mapping of a control resource set to first three symbols of a slot with control channel information occupying last two symbols of the control resource set according to an embodiment of the present disclosure.
Figure 6F:
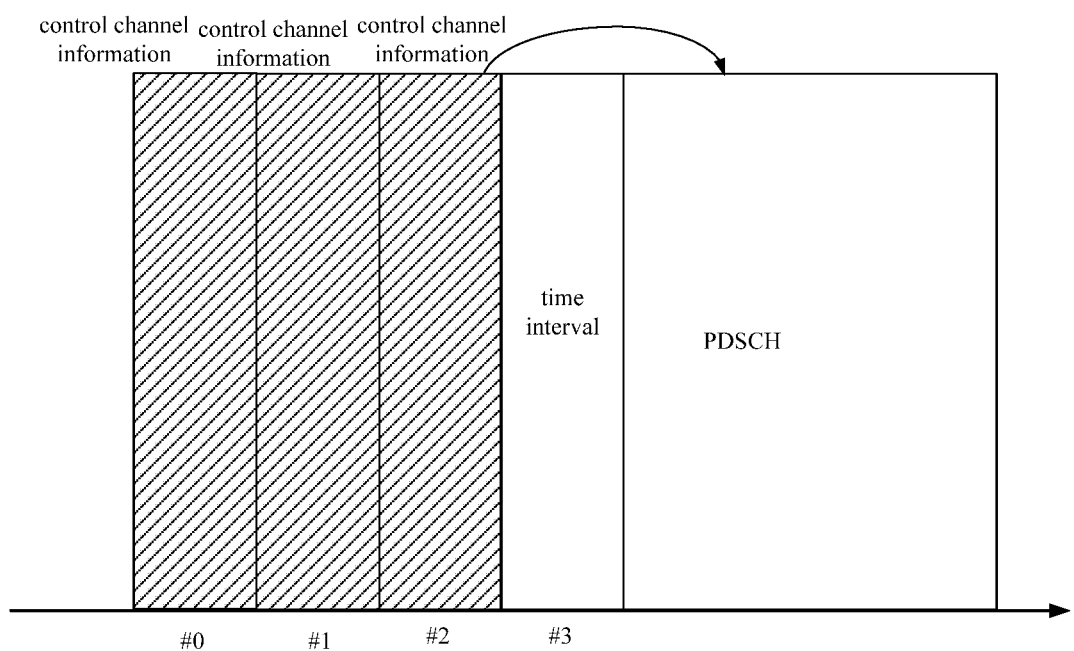
FIG. 6F is a schematic diagram showing mapping of a control resource set to first three symbols of a slot with control channel information occupying all symbols of the control resource set according to an embodiment of the present disclosure.

Similarly, as shown in FIG. 6A, FIG. 6B and FIG. 6C, the DCI occupies part or all of the non-last symbols in the control resource set, then the network device determines that no time interval is set between the control resource set and the PDSCH, and the PDSCH is used to receive data information for the terminal from the #3 symbol according to the quasi-co-location information. As shown in FIG. 6D, FIG. 6E, and FIG. 6F, DCI occupies the last symbol in the control resource set, and the network device determines that a time interval is set between the control resource set and the PDSCH, and then the terminal determines that PDSCH occupies symbols following the #3 symbol.

It should be noted that, in implementation, the UE-specific control channel information occupies part or all of non-last symbols in the control resource set, the network device determines that no time interval is set between the control resource set and the PDSCH, then all control resource symbols after symbols occupied by the UE-specific control channel information in the control resource set symbol, may be used to perform switching between the quasi co-location information and data information. Taking FIG. 5A as an example, in this case, the #0 symbol in the control resource set is occupied by the UE-specific control channel information, and no time interval is set between the control resource set and the PDSCH. At this point, the #1 symbol in the control resource set has the same function as the time interval, and may be used for performing beam switching.

In specific implementation process, no data is transmitted in the time interval, thus the terminal does not receive downlink data in the time interval. If data is transmitted in the time interval, the information is transmitted by adopting pre-defined quasi co-location information; and at this point, in the time interval, the terminal cannot receive the data information by optimal beam.

In implementation, whether a time interval needs to be set between the control resource set and the PDSCH is determined according to the symbol occupied by the UE-specific information in the control resource set, thus, whether the time interval needs to be set can be dynamically configured, thereby improving scheduling flexibility.

Optionally, when the network device determines that a time interval is set between the control resource set and the PDSCH, the network device determines the number of symbols occupied by the time interval according to the beam-switching processing time reported by the terminal.

Specifically, in implementation, after determining that a time interval needs to be set between the control resource set and the PDSCH, the network device further determines the number of symbols that specifically need to be occupied by the time interval in the time domain according to the information reported by the terminal.

The network device determines the number of symbols occupied by the time interval mainly according to the beam-switching processing time reported by the terminal.

For example, in an implementation, a symbol of a time interval indicates that the time for switching between the quasi-co-location information and the data information is 6S. If beam-switching processing time reported by the terminal is less than or equal to 6S, when the network device receives the information, the network device configures one time interval in a slot according to the time domain and the frequency domain, that is, the time interval occupies one symbol in the time domain. If the beam-switching processing time reported by the terminal is greater than 6S, the network device configures the number of symbols for the time interval according to a specific time. At this point, assuming that the beam-switching processing time reported by the terminal is any time from 6S to 12S, since the beam-switching processing time reported by the terminal time does not exceed the time required by two time intervals, the network device determines that the time interval needs to occupy two symbols in the time domain.

It should be noted that the information reported by the terminal to the network device includes not only the beam-switching processing time, but also information such as the number of beams of the terminal and the service type.

In implementation, the network device determines the number of symbols of an extra time interval according to the processing interval reported by the terminal. Thus, the network device can flexibly schedule the time required to switch the quasi-co-location information included in the DCI to PDSCH for receiving data information, thereby ensuring normal beam switching as well as the utilization rate of time domain resources.

Optionally, when the network device configures the terminal according to the judgement result, the network device determines position of the PDSCH according to the judgement result, and configures the terminal according to the determined position of the PDSCH.

In implementation, the position of the PDSCH may be varied with different judgement result.

Specifically, if the judgement result is that the time interval exists, PDSCH is located after the time interval and adjacent to the time interval; or if the judgement result is that no time interval exists, PDSCH is located after the control resource set and is adjacent to the control resource set.

Taking FIG. 4 and FIG. 5A as an example, as shown in FIG. 4, there is a time interval between the control resource set and the PDSCH, and PDSCH is disposed after the time interval and adjacent to the time interval. As shown in FIG. 5A, no time interval is set between the control resource set and PDSCH, and PDSCH is disposed after the control resource set and adjacent to the control resource set.

It should be noted that, the above is only exemplified with FIG. 4 and FIG. 5A; in implementation, if there is a time interval between the control resource set and PDSCH, the PDSCH is located after the time interval and adjacent to the time interval; and if there is no time interval, PDSCH is located after the control resource set and adjacent to the control resource set.

In implementation, the position of the PDSCH in the time domain can be accurately determined according to whether the time interval exists or not, thereby ensuring the utilization rate of time domain resources.

Figure 7:
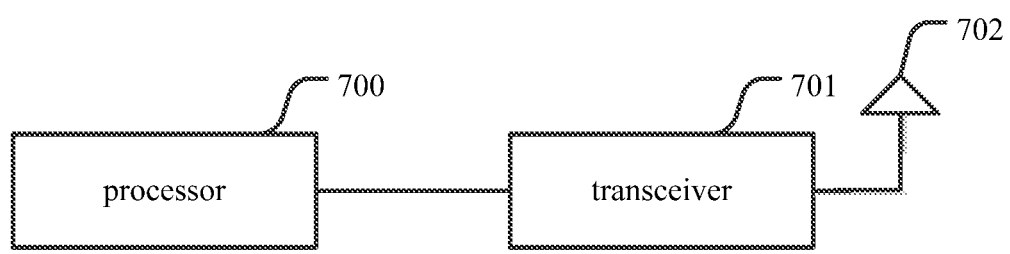
FIG. 7 is a first schematic diagram of a network device for performing data transmission according to an embodiment of the present disclosure.

As shown in FIG. 7, a network device for performing data transmission according to an embodiment of the present disclosure includes: a processor 700 and a transceiver 701.

The processor 700 is used to determine a processing interval of a terminal according to parameter(s) reported by the terminal; compare a scheduling interval for resource allocation for the terminal with the determined processing interval of the terminal; when the scheduling interval is less than the processing interval, use the transceiver 701 to transmit data through PDSCH after the scheduling interval by using pre-configured quasi co-location information corresponding to the terminal.

Optionally, the processor 700 is further used to:

when the scheduling interval is not less than the processing interval, transmit data through the PDSCH after the scheduling interval by using quasi-co-location information in DCI corresponding to the terminal.

Optionally, the pre-configured quasi co-location information corresponding to the terminal is configured by the network device through RRC signaling or MAC-CE signaling; or, the pre-configured quasi co-location information corresponding to the terminal is the same as quasi co-location information used for receiving DCI.

Optionally, the processor 700 is further used to:

determine time domain position of UE-specific control information according to a mapping position of control resource set corresponding to the terminal in a slot and a position of DCI corresponding to the terminal in the control resource set; judge whether a time interval is set between the control resource set and PDSCH according to the determined time domain position; and configure the terminal according to the judgment result.

Optionally, the processor 700 is further used to:

when the UE-specific control channel information occupies part or all of non-last symbols in the control resource set, determine that no time interval is set between the control resource set and the PDSCH; or, when the UE-specific control channel information occupies the last symbol in the control resource set, determine that a time interval is set between the control resource set and PDSCH.

Optionally, the processor 700 is further used to: determine the number of symbols occupied by the time interval according to beam-switching processing time reported by the terminal.

Optionally, the processor 700 is specifically configured to:

determine position of the PDSCH according to the judgement result, and configure the terminal according to the determined position of the PDSCH.

Optionally, if the judgement result indicates that a time interval exists, PDSCH is located after the time interval and is adjacent to the time interval. If the judgement result is that no time interval exists, PDSCH is located after the control resource set and is adjacent to the control resource set.

Figure 8:
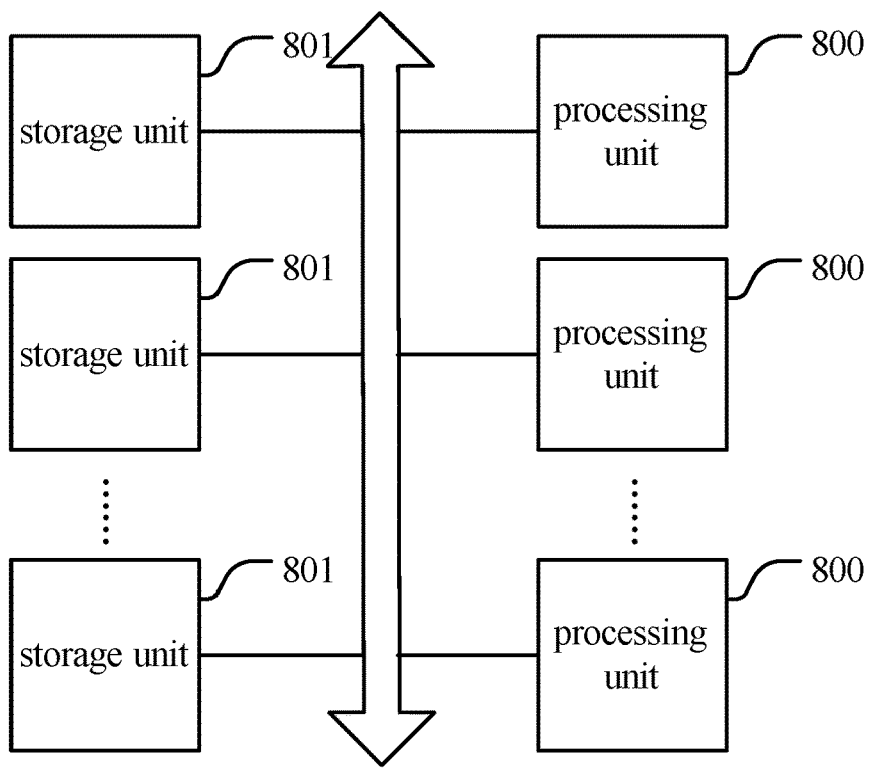
FIG. 8 is a second schematic diagram of a network device for performing data transmission according to an embodiment of the present disclosure.

As shown in FIG. 8, a network device for performing data transmission includes: at least one processing unit 800 and at least one storage unit 801. The storage unit 801 stores program codes. The program codes are executed by the processing unit 800 to cause the processing unit 800 to execute steps of the data transmission method performed by the network device.

Figure 9:
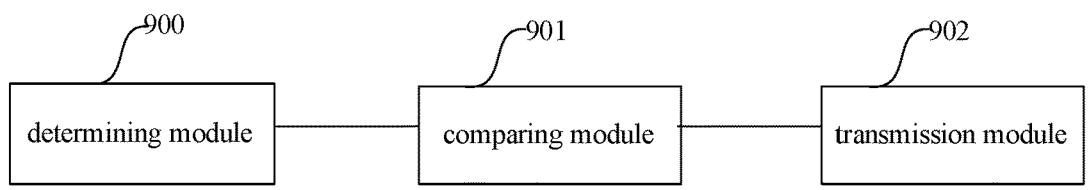
FIG. 9 is a third schematic diagram of a network device for performing data transmission according to an embodiment of the present disclosure.

As shown in FIG. 9, a network device for performing data transmission according to an embodiment of the present disclosure includes:

a determining module 900 used to determine a processing interval of a terminal according to parameter(s) reported by the terminal;

a comparing module 901 used to compare a scheduling interval for resource allocation for the terminal with the determined processing interval of the terminal;

a transmission module 902 used to, when the scheduling interval is less than the processing interval, transmit data through PDSCH after the scheduling interval by using pre-configured quasi co-location information corresponding to the terminal.

Optionally, the comparing module 901 is further used to:

when the scheduling interval is not less than the processing interval, transmit data through the PDSCH after the scheduling interval by using quasi-co-location information in DCI corresponding to the terminal.

Optionally, the pre-configured quasi co-location information corresponding to the terminal is configured by the network device through RRC signaling or MAC-CE signaling; or, the pre-configured quasi co-location information corresponding to the terminal is the same as quasi co-location information used for receiving DCI.

Optionally, the determining module 900 is further used to determine time domain position of UE-specific control information according to a mapping position of control resource set corresponding to the terminal in a slot and a position of DCI corresponding to the terminal in the control resource set;

the comparing module 901 is further used to judge whether a time interval is set between the control resource set and PDSCH according to the determined time domain position;

the transmission module 902 is further used to configure the terminal according to the judgment result.

Optionally, the comparing module 901 is specifically used to:

when the UE-specific control channel information occupies part or all of non-last symbols in the control resource set, determine that no time interval is set between the control resource set and the PDSCH; or, when the UE-specific control channel information occupies the last symbol in the control resource set, determine that a time interval is set between the control resource set and PDSCH.

Optionally, the comparing module 901 is further used to: determine the number of symbols occupied by the time interval according to beam-switching processing time reported by the terminal.

Optionally, the transmission module 902 is specifically used to:

determine position of the PDSCH according to the judgement result, and configure the terminal according to the determined position of the PDSCH.

Optionally, if the judgement result indicates that a time interval exists, PDSCH is located after the time interval and is adjacent to the time interval. If the judgement result is that no time interval exists, PDSCH is located after the control resource set and is adjacent to the control resource set.

Figure 10:
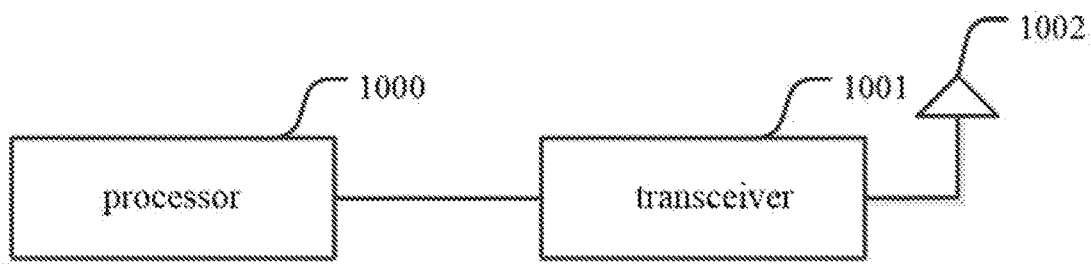
FIG. 10 is a fourth schematic diagram of a terminal for performing data transmission according to an embodiment of the present disclosure.

As shown in FIG. 10, a terminal for performing data transmission according to an embodiment of the present disclosure includes a transceiver 1001.

The transceiver 1001 is used to report parameter(s) to a network device; and receive data through PDSCH during the processing interval by using pre-configured quasi co-location information corresponding to the terminal.

Optionally, the terminal further includes a processor 1000.
The processor 1000 is used to:
determine a starting position of PDSCH through received DCI.

When the processor 1000 determines that the starting position of the PDSCH is in the processing interval, the transceiver 1001 is used to receive data through the PDSCH after the processing interval by using the pre-configured quasi-co-location information corresponding to the terminal; or, when the processor 1000 determines that the starting position of the PDSCH is after the processing interval, the transceiver 1001 is used to receive data through the PDSCH after the processing interval by using the quasi-co-location information in DCI.

Optionally, the processor 1000 is further used to:
when the starting position of the PDSCH is after the processing interval and the quasi co-location information in the DCI is different from the pre-configured quasi co-location information corresponding to the terminal, perform beam switching according to the quasi co-location information in the DCI.

Optionally, the corresponding pre-configured quasi co-location information is configured by the network device through RRC signaling or MAC-CE signaling; or, the corresponding pre-configured quasi co-location information is the same as quasi co-location information used for receiving the DCI.

Optionally, the parameter(s) includes a processing capability and/or a length of the processing interval of the terminal.

Figure 11:
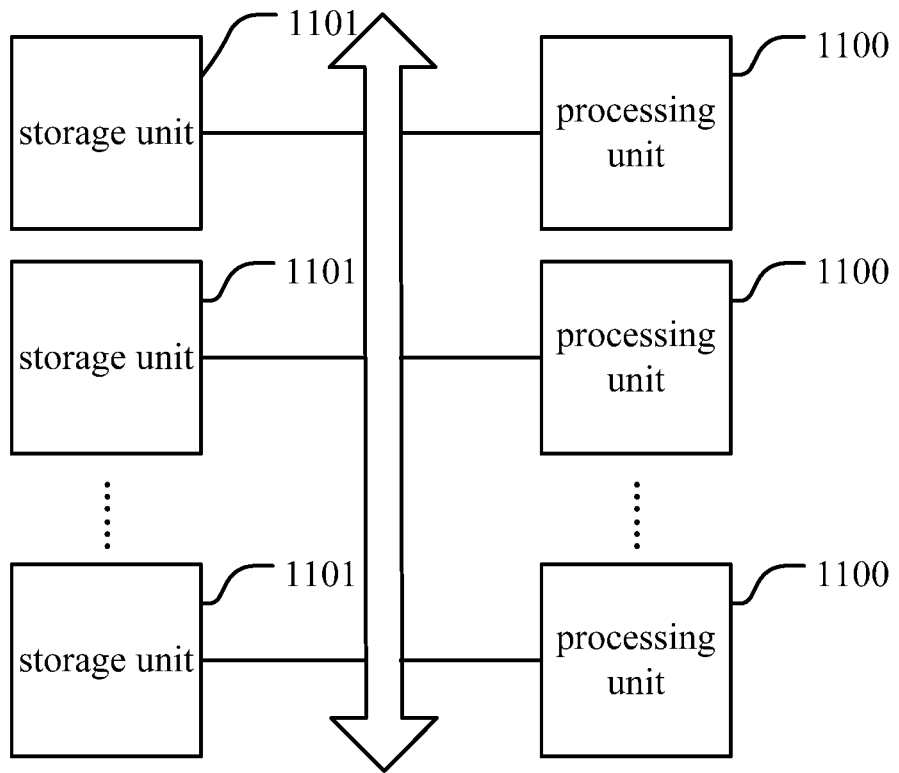
FIG. 11 is a fifth schematic diagram of a terminal for performing data transmission according to an embodiment of the present disclosure.

As shown in FIG. 11, a terminal for performing data transmission according to an embodiment of the present disclosure includes at least one processing unit 1100 and at least one storage unit 1101. The storage unit 1101 stores program codes. The program codes are executed by the processing unit 1100 to cause the processing unit 1100 to execute steps of any scheme in which the terminal assists the network device in data transmission.

Figure 12:
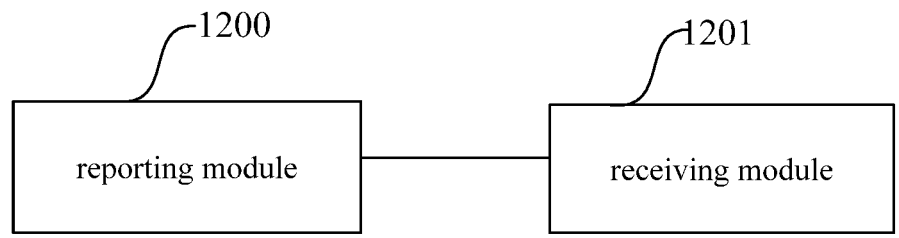
FIG. 12 is a sixth schematic diagram of a terminal for performing data transmission according to an embodiment of the present disclosure.

As shown in FIG. 12, a terminal for performing data transmission according to an embodiment of the present disclosure includes:

a reporting module 1200 used to report parameter(s) to a network device;

a receiving module 1201 used to receive data through PDSCH during a processing interval by using pre-configured quasi co-location information corresponding to the terminal.

Optionally, the reporting module 1200 is further used to:
determine a starting position of PDSCH through received DCI; when the starting position of the PDSCH is in the processing interval, receive data through the PDSCH after the processing interval by using the pre-configured quasi-co-location information corresponding to the terminal; or, when the starting position of the PDSCH is after the processing interval, receive data through the PDSCH after the processing interval by using the quasi-co-location information in DCI.

Optionally, the reporting module 1200 is further used to:
when the starting position of the PDSCH is after the processing interval and the quasi co-location information in the DCI is different from the pre-configured quasi co-location information corresponding to the terminal, perform beam switching according to the quasi co-location information in the DCI.

Optionally, the corresponding pre-configured quasi co-location information is configured by the network device through RRC signaling or MAC-CE signaling; or, the corresponding pre-configured quasi co-location information is the same as quasi co-location information used for receiving the DCI.

Optionally, the parameter(s) includes a processing capability and/or a length of the processing interval of the terminal.

In some possible implementations, various aspects of data transmission provided in the embodiments of the present disclosure may also be implemented in the form of a program product including program codes for causing a computer device to perform the steps of the method for performing data transmission according to various exemplary embodiments of the present disclosure described in this specification when the program code runs on the computer device.

The program product may employ any combination of one or more readable media. The readable medium may be a readable signal medium or a readable storage medium. The readable storage medium may be, for example, but is not limited to, an electronic, magnetic, optical, electromagnetic, infrared, or semiconductor system, apparatus, or device, or any combination of the foregoing. More specific examples (a non-exhaustive list) of the readable storage medium include: an electrical connection having one or more wires, a portable disk, a hard disk, a Random Access Memory (RAM), a Read Only Memory (ROM), an Erasable Programmable Read Only Memory (EPROM) or flash memory, an optical fiber, a portable compact disc read only memory (CD-ROM), an optical storage device, a magnetic storage device, or any suitable combination of the foregoing.

A program product for performing data transmission according to an embodiment of the present disclosure may be in the form of a (CD-ROM) and include program codes, and may be run on a server device. However, the program product of the present disclosure is not limited thereto, and in this document, the readable storage medium may be any tangible medium that contains or stores a program, which can be used by or in connection with an information transmission apparatus or device.

A readable signal medium may include a data signal that is propagated in baseband or as part of a carrier and carries readable program codes. Such a propagated data signal may take a variety of forms, including, but not limited to, an electromagnetic signal, an optical signal, or any suitable combination of the foregoing. The readable signal medium may also be any readable medium other than the readable storage medium, and the readable medium can send, propagate or transmit a program for use by or in connection with a periodic network action system, apparatus or device.

The program codes embodied on the readable medium may be transmitted using any appropriate medium, including but not limited to, wireless, wired, fiber optic, Radio Frequency (RF), or any suitable combination of the foregoing. The program codes for carrying out operations of the present disclosure may be written in any combination of one or more programming languages, including an object oriented programming language such as Java, C++ and conventional procedural programming languages, such as the "C" programming language or similar programming languages. The program codes may execute entirely on the user's computing device, partly on the user's device, as a stand-alone software package, partly on the user's computing device and partly on a remote computing device, or entirely on the remote computing device or server. In the case of the remote computing device, the remote computing device may be connected to the user computing device over any kind of network, or may be connected to an external computing device, such as local Area Network (LAN) or Wide Area Network (WAN).

For the method for performing data transmission performed by the network device, one embodiment of the present disclosure further provides a computing device readable storage medium, of which content is not lost after power failure. The storage medium stores therein a software program including program codes. When the program codes are executed on a computing device, the software program is read and executed by one or more processors to implement any scheme of data transmission performed by the network device according to the embodiments of the present disclosure.

For the method for assisting network device to transmit data by terminal, one embodiment of the present disclosure further provides a computing device readable storage medium, of which content is not lost after power failure. The storage medium stores therein a software program including program codes. When the program codes are executed on a computing device, the software program is read and executed by one or more processors to implement any scheme of assisting the network device to transmit data by the terminal according to the embodiments of the present disclosure.

Based on the same inventive concept, one embodiment of the present disclosure further provides a method for performing data transmission, and since the terminal corresponding to the method is the terminal for performing data transmission in the embodiment of the present disclosure, and the principle of the method for solving the problem is similar to that of the terminal, the implementation of the method can refer to the implementation of the terminal, and the repeated parts are not described again.

Figure 13:
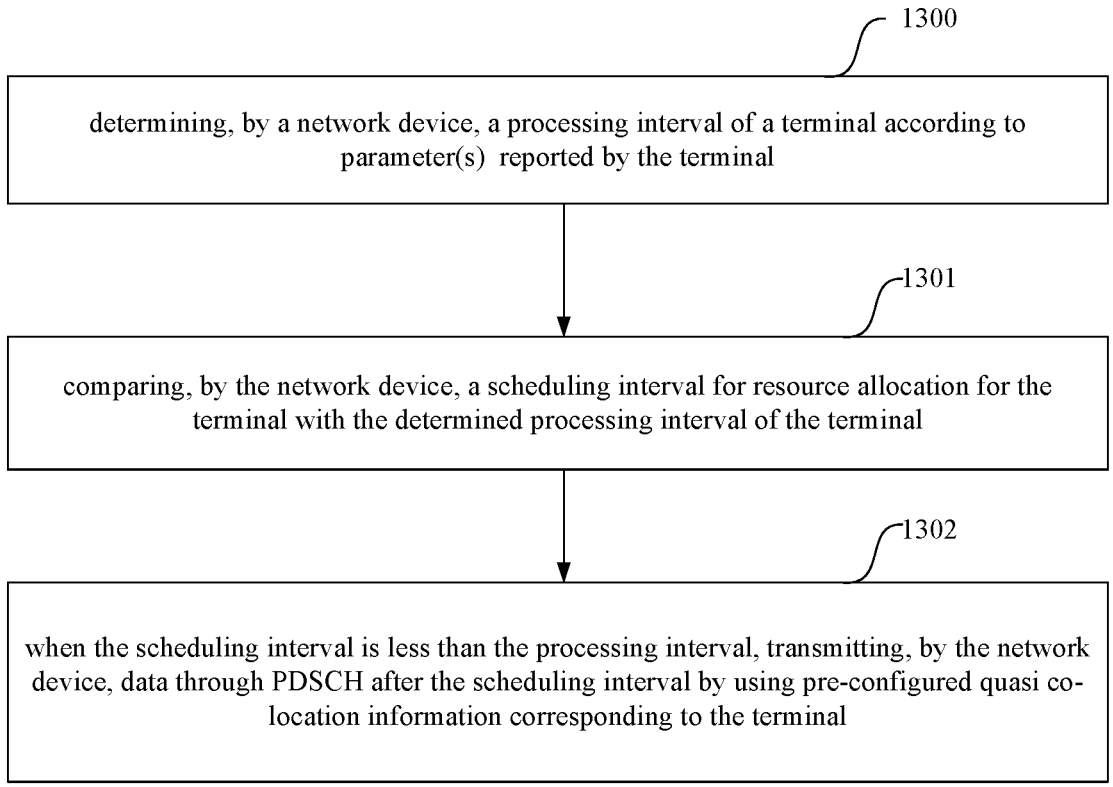
FIG. 13 is a first flowchart of a data transmission method according to an embodiment of the disclosure.

As shown in FIG. 13, a method for performing data transmission according to an embodiment of the present disclosure includes the following steps:

Step 1300: determining, by a network device, a processing interval of a terminal according to parameter(s) reported by the terminal;

Step 1301: comparing, by the network device, a scheduling interval for resource allocation for the terminal with the determined processing interval of the terminal;

Step 1302: when the scheduling interval is less than the processing interval, transmitting, by the network device, data through PDSCH after the scheduling interval by using pre-configured quasi co-location information corresponding to the terminal.

Optionally, after comparing, by the network device, a scheduling interval for resource allocation for the terminal with the determined processing interval of the terminal, the method further includes:

when the scheduling interval is not less than the processing interval, transmitting data through the PDSCH after the scheduling interval by using quasi-co-location information in DCI corresponding to the terminal.

Optionally, the pre-configured quasi co-location information corresponding to the terminal is configured by the network device through RRC signaling or MAC-CE signaling; or, the pre-configured quasi co-location information corresponding to the terminal is the same as quasi co-location information used for receiving DCI.

Figure 14:
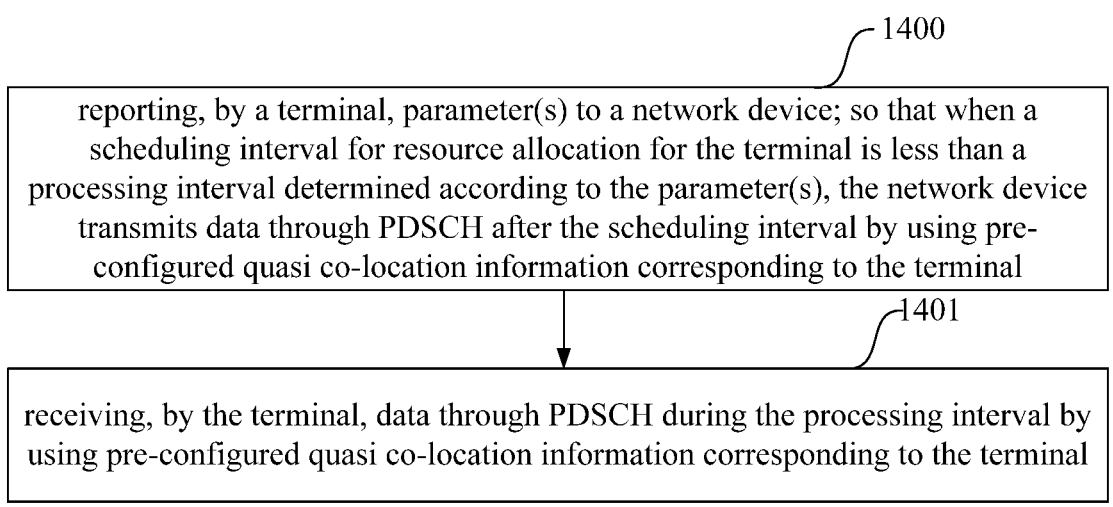
FIG. 14 is a second flowchart of a data transmission method according to an embodiment of the disclosure.

As shown in FIG. 14, a method for performing data transmission according to an embodiment of the present disclosure includes the following steps:

Step 1400: reporting, by a terminal, parameter(s) to a network device; so that when a scheduling interval for resource allocation for the terminal is less than a processing interval determined according to the parameter(s), the network device transmits data through PDSCH after the scheduling interval by using pre-configured quasi co-location information corresponding to the terminal;

Step 1401: receiving, by the terminal, data through PDSCH during the processing interval by using pre-configured quasi co-location information corresponding to the terminal.

Optionally, after reporting, by a terminal, parameter(s) to a network device, the method further includes:

determining, by the terminal, a starting position of PDSCH through received DCI;

when the starting position of the PDSCH is in the processing interval, receiving, by the terminal, data through the PDSCH after the processing interval by using the pre-configured quasi-co-location information corresponding to the terminal; or, when the starting position of the PDSCH is after the processing interval, receiving, by the terminal, data through the PDSCH after the processing interval by using the quasi-co-location information in DCI.

Optionally, after determining, by the terminal, a starting position of PDSCH through received DCI, the method further includes:

when the starting position of the PDSCH is after the processing interval and the quasi co-location information in the DCI is different from the pre-configured quasi co-location information corresponding to the terminal, performing, by the terminal, beam switching according to the quasi co-location information in the DCI.

Optionally, the pre-configured quasi co-location information corresponding to the terminal is configured by the network device through RRC signaling or MAC-CE signaling; or, the pre-configured quasi co-location information corresponding to the terminal is the same as quasi co-location information used for receiving the DCI.

Optionally, the parameter(s) includes a processing capability and/or a length of the processing interval of the terminal.

The present disclosure is described above with reference to block diagrams and/or flowchart illustrating methods, apparatus (systems) and/or computer program products according to embodiments of the present disclosure. It will be understood that one block in the block diagrams and/or flowcharts, and combinations of blocks in the block diagrams and/or flowcharts, may be implemented by computer program instructions. These computer program instructions may be provided to a processor of a general purpose computer, special purpose computer, and/or other programmable data processing apparatus to produce a machine, such that the instructions, which are executed by the processor of the computer and/or other programmable data processing apparatus, create a method for implementing the functions/acts specified in the block diagrams and/or flowchart.

Accordingly, the present disclosure may also be embodied in hardware and/or in software (including firmware, resident software, micro-code, etc.). Furthermore, the present disclosure may take the form of a computer program product on a computer-usable or computer-readable storage medium having computer-usable or computer-readable program codes embodied in the medium for use by or in connection with an instruction execution system. In the context of the present disclosure, a computer-usable or computer-readable medium may be any medium that can contain, store, communicate, propagate, or transport the program for use by or in connection with the instruction execution system, apparatus, or terminal.

It will be apparent to those skilled in the art that various changes and modifications may be made to the present disclosure without departing from the spirit and scope of the present disclosure. Thus, it is intended that the present disclosure cover the modifications and variations of this disclosure provided they fall within the scope of the appended claims and their equivalents.

What is claimed is:

1. A method for performing data transmission, comprising:
   determining, by a network device, a processing interval of a terminal according to parameter(s) reported by the terminal;
   comparing, by the network device, a scheduling interval for resource allocation for the terminal with the determined processing interval of the terminal;
   if the scheduling interval is less than the processing interval, transmitting, by the network device, data through a physical downlink shared channel (PDSCH) after the scheduling interval by using pre-configured quasi co-location information corresponding to the terminal.

2. The method according to claim 1, wherein after the comparing, by the network device, a scheduling interval for resource allocation for the terminal with the determined processing interval of the terminal, the method further comprises:
   if the scheduling interval is not less than the processing interval, transmitting, by the network device, data through the PDSCH after the scheduling interval by using quasi-co-location information indicated by a transmission configuration indication (TCI) field in downlink control information (DCI) of the terminal.

3. The method according to claim 1, wherein the pre-configured quasi co-location information corresponding to the terminal is configured by the network device through radio resource control (RRC) signaling or media access control-control element (MAC-CE) signaling; or, the pre-configured quasi co-location information corresponding to the terminal is the same as quasi co-location information used for receiving DCI.

4. A network device for performing data transmission, comprising: at least one processing unit and at least one storage unit; wherein the storage unit stores program codes, and the program codes are executed by the processing unit to cause the processing unit to perform steps of the method according to claim 1.

5. A computing device readable storage medium comprising program codes; wherein when the program codes are run on a computing device, the program codes causes the computing device to perform steps of the method according to claim 1.

6. A method for performing data transmission, comprising:
   reporting, by a terminal, parameter(s) to a network device; wherein the parameter(s) is used to determine a processing interval of the terminal;
   wherein after the reporting, by a terminal, parameter(s) to a network device, the method further comprises:
   determining, by the terminal, a scheduling interval through received downlink control information (DCI);
   when the scheduling interval is less than the processing interval, receiving, by the terminal, data through a physical downlink shared channel (PDSCH) by using pre-configured quasi-co-location information corresponding to the terminal; or, when the scheduling interval is greater than or equal to the processing interval, receiving, by the terminal, data through the PDSCH after the processing interval by using quasi-co-location information indicated by a transmission configuration indication (TCI) field in the DCI.

7. The method according to claim 6, wherein pre-configured quasi co-location information corresponding to the terminal is configured by the network device through radio resource control (RRC) signaling or media access control-control element (MAC-CE) signaling; or, the pre-configured quasi co-location information corresponding to the terminal is the same as quasi co-location information used for receiving DCI.

8. The method according to claim 6, wherein the parameter(s) comprises processing capability of the terminal and/or the processing interval.

9. A terminal for performing the method according to claim 6, comprising: a transceiver;
   wherein the transceiver is used to report parameter(s) to a network device, and receive data through the PDSCH during a processing interval by using pre-configured quasi co-location information corresponding to the terminal.

10. The terminal according to claim 9, wherein the terminal further comprises a processor; the processor is used to,
    determine a scheduling interval through received DCI;
    when the processor determines that the scheduling interval is less than the processing interval, the transceiver is used to receive data through the PDSCH after the processing interval by using pre-configured quasi-co-location information corresponding to the terminal; or, when the processor determines that the scheduling interval is greater than or equal to the processing interval, the transceiver is used to receive data through the PDSCH after the processing interval by using quasi-co-location information indicated by the TCI field in DCI.

11. The terminal according to claim 9, wherein the pre-configured quasi co-location information corresponding to the terminal is configured by the network device through radio resource control (RRC) signaling or media access control-control element (MAC-CE) signaling; or, the pre-configured quasi co-location information corresponding to the terminal is the same as quasi co-location information used for receiving DCI.

12. The terminal according to claim 9, wherein the parameter(s) comprises processing capability of the terminal and/or the processing interval.

13. A terminal for performing data transmission, comprising: at least one processing unit and at least one storage unit; wherein the storage unit stores program codes, and the program codes are executed by the processing unit to cause the processing unit to perform steps of the method according to claim 6.

14. A computing device readable storage medium comprising program codes; wherein when the program codes are run on a computing device, the program codes causes the computing device to perform steps of the method according to claim 6.

15. A network device for performing data transmission, comprising:
a processor and a transceiver;
wherein the processor is used to determine a processing interval of a terminal according to parameter(s) reported by the terminal; compare a scheduling interval for resource allocation for the terminal with the determined processing interval of the terminal; when the scheduling interval is less than the processing interval, use the transceiver to transmit data through a physical downlink shared channel (PDSCH) after the scheduling interval by using pre-configured quasi co-location information corresponding to the terminal.

16. The network device according to claim 15, wherein the processor is further used to, when the scheduling interval is not less than the processing interval, transmit data through the PDSCH after the scheduling interval by using quasi-co-location information indicated by a transmission configuration Indication (TCI) field in downlink control information (DCI) corresponding to the terminal.

17. The network device according to claim 15, wherein the pre-configured quasi co-location information corresponding to the terminal is configured by the network device through radio resource control (RRC) signaling or media access control-control element (MAC-CE) signaling; or, the pre-configured quasi co-location information corresponding to the terminal is the same as quasi co-location information used for receiving DCI.

* * * * *